United States Patent Office 3,387,998
Patented June 11, 1968

3,387,998
SURFACE-SIZING OF PAPER WITH CYANOETHYL ACID HYDROLYZED STARCH
Robert M. Powers, Decatur, Ill., assignor to A. E. Staley Manufacturing Company, Decatur, Ill., a corporation of Delaware
No Drawing. Filed Apr. 27, 1964, Ser. No. 362,991
4 Claims. (Cl. 117—156)

ABSTRACT OF THE DISCLOSURE

A cyanoethyl ether starch acid-hydrolyzed to a fluidity of about 75 to 97 cc. having a cyanoethyl D.S. of 0.01 to 0.09 for surface sizing paper webs.

---

This invention relates to granular cyanoethyl ether of acid-hydrolyzed starch, which is gelatinizable in water at a neutral pH, and its use as a paper surface-sizing agent, particularly in the size press operation.

Paper is often surface-sized with a sizing agent. The sizing agent cements the cellulosic fibers to the body of the paper and to each other, thereby increasing the tensile strength and Mullen value or burst strength of the paper. Accordingly, the paper can be erased without destroying its fiber structure. Surface sizing also gives paper a relatively smooth, hard surface film which reduces "feathering" when written upon with pen and ink, will not catch the pen point (or pencil point) when paper is written upon and will not pick if the paper is printed with tacky inks. In addition, the porosity of the paper is decreased, since the surface pores of the paper are sealed. Surface sizing is often more important than internal sizing agents for writing papers, printing papers and certain grades of wrapping paper.

Starches, particularly alkaline-hydrochlorite-oxidized starch and hydroxyethyl starch ethers, are the principal surface sizing agents utilized. Both alkaline-hydrochlorite-oxidized starch and hydroxyethyl starch ether are exceptionally fine surface sizing agents. The principal drawback to the use of alkaline-hydrochlorite-oxidized starch is its dispersing effect on pigments and cellulosic fines, when the paper broke is repulped. Inasmuch as about 5 to 25% of the paper produced in a paper mill ends up as broke and must be repulped and reformed into paper, the loss of pigment due to the dispersing effect of oxidized starch used in the surface sizing operation is costly. Since size press starch is usually more highly oxidized than oxidized starch applied by other means to obtain maximum sizing, the effect of broke sized with an oxidized size press starch is most serious.

A principal drawback to the use of hydroxyethyl starch ether is its relatively high cost when compared with the cost of alkaline-hydrochlorite-oxidized starch. The higher price of hydroxyethyl starch is due to the higher cost of ethylene oxide and additional expense in using a brine solution for the derivatization of the starch. A brine solution is necessary for the preparation of a granular hydroxyethyl ether of starch.

The object of this invention is to provide a low-cost, granular surface sizing starch, particularly one useful at the size press, which is gelatinizable at a neutral pH and does not disperse pigments. Other objects will be apparent in the following description.

We have now found that granular cyanoethyl ethers of acid-hydrolyzed starch, which is gelatinizable at a neutral pH, has all the properties required of a surface sizing starch. Further, it is less expensive than hydroxyethyl starch and does not disperse pigments. Inasmuch as the cyanoethyl ether of acid-hydrolyzed starch can be produced in from ⅓ to ½ the time of a hydroxyethyl size press starch, the capacity of a starch derivatization facility can be doubled or tripled with no additional capital investment. Paper, sized at the size press with the cyanoethyl ether of acid-hydrolyzed starch, also shows improved results over paper sized with hydroxyethyl starch according to Tappi Routine Control Method RC-14 entitled Ink Penetration of Paper (flotation) and modified Tappi Routine Control Method RC-74 entitled Surface Sizing Feathering Test.

We are aware that cyanoethylated starches, i.e. starch ethers produced by reaction with acrylonitrile, have been disclosed in a number of patents. For example, U.S. Patents 2,965,632 discusses a number of patents which disclose the cyanoethylation of various polysaccharides. This patent, to Paschall et al., is directed to the preparation of granular cyanoethyl starch having a degree of substitution (D.S.) of 0.1 to 1.0, which can be pasted in aqueous alkali at a pH not exceeding 11. The patentees of U.S. Patent 2,965,632 state at column 2, lines 7–10, "The introduction of as few as two cyanoethyl groups per 100 glucose units resulted in a product which could not be completely gelatinized by cooking in water at a neutral pH," i.e. the starch is inhibited. While it is useful to be able to paste a starch derivative in water at an alkaline pH, it is even more desirable, and in many cases absolutely essential, that the starch derivative be capable of pasting in water at a neutral pH. If a starch derivative is pasted in aqueous alkali and the paste used to surface size paper, there is a tendency for the size solution to leach out the internal rosin size in the paper and also a tendency for the paper to become discolored. Accordingly, in surface sizing of paper, it is essential that the starch be capable of pasting in water at a neutral pH. Canadian Patent 563,046 discloses that the cyanoethylation of granular unmodified raw starch results in a granular cyanoethyl starch which has a smaller tendency to cake in the presence of moisture than the raw starch from which the derivative had been prepared. This is an indication that the starch has been inhibited somewhat by derivatization as would be expected from the disclosure of the Paschall et al. patent.

As indicated above our invention resides in the size of a granular cyanoethyl ether of acid-hydrolyzed starch, which is gelatinizable at a neutral pH. In order to be suitable for use in our invention, it is essential that the starch be partially degraded. Partial controlled degradation of the starch decreases the viscosity of the starch paste used in the sizing operation, thereby permitting the use of a higher solids sizing composition. The controlled degradation of the starch also increases the ability of the starch to penetrate the cellulosic fibers and subsequently to bond the surface fibers together. Normally, a cyanoethyl ether of unmodified starch would be unsuitable for use as a size-press starch.

There are basically three chemical methods used commercially for degrading starch, namely enzyme conversion, oxidation with alkaline hypochlorite or other oxidizing agent and acid hydrolysis. Enzyme conversion is unsuitable for use in our invention since the starch must be pasted prior to the enzyme conversion. Accordingly, no granular product can be obtained. The oxidized starches, as pointed out above, have a dispersing effect on pigments. Inasmuch as a size-press starch must be of higher fluidity and therefore requires more severe oxidation than a starch which is to be applied to paper elsewhere the dispersing effect on pigment of an oxidized starch creates a particularly severe problem when broke is repulped and recycled to the stock system supplying the paper machine.

In general, the granular starch of this invention can be acid-hydrolyzed to a fluidity known in this art of from about 18 to 97 cc. The method of measuring the fluidity is explained below. At this point it is only necessary to understand that the higher the fluidity of the starch the greater the degree of degradation of the starch. In order to impart to the paper maxmum tensile strength and Mullen burst value when sizing at the size press, it is necessary to use a granular starch acid-hydrolyzed to a fluidity of 75-97 cc., as the base starch. An acid-hydrolyzed starch of this fluidity (75-97 cc.) is most suitable for cementing cellulosic fibers to the body of the paper and to each other. Accordingly, the sized paper is most resistant to tearing of fibers during erasing. Acid-hydrolysis seems to have the added advantage that it tends to improve the pasting properties of the cyanoethyl starch. Further, the higher the fluidity of the starch the higher the total solids that can be used in the sizing bath. This is particularly important when using the size press. When sizing at the calender stack less, highly degraded (lower fluidity) cyanoethyl starches can be used with advantage in order to form a less porous sheet.

For use in our invention, the cyanoethyl starch must have a D.S. of from about 0.01 to 0.09, preferably 0.03 to 0.06. Above a D.S. of 0.09 our granular cyanoethyl ethers of acid-hydrolyzed starches require aqueous alkali in order to be pasted. Below a D.S. of 0.01 the cyanoethyl starch paste has a tendency to set back. In the D.S. range of 0.03 to 0.06, the starch pastes readily in water at pH7, and there is virtually no tendency for the starch paste to set back.

The granular cyanoethyl ethers of acid-hydrolyzed starch of this invention can be prepared by the aqueous acid hydrolysis of starch (e.g. corn starch, tapioca starch, wheat starch, potato starch, rice starch, waxy maize starch, etc.) in a manner well known to those in this art, followed by the aqueous cyanoethylation of the starch at an alkaline pH. If desired, acid hydrolysis can be carried out after the cyanoethylation reaction if sufficient care is used to avoid substantial hydrolysis of the nitrile groups.

In somewhat greater detail, an aqueous granular starch suspension containing about 10% to 60% by weight starch is prepared. Then a strong acid, such as sulfuric acid or hydrochloric acid is added in a concentration of about 0.1 to 10% by weight based on the dry weight of the starch. If desired, the granular starch can be added to the acid solution. The suspension is heated to a temperature under the gelatinization temperature of the starch. Heating is continued until the acid-hydrolyzed starch has reached the desired fluidity. The slurry is then neutralized with a strong base, such as sodium hydroxide, potassium hydroxide, tetramethyl ammonium hydroxide, sodium carbonate, calcium hydroxide, etc. The granular starch can be isolated by filtration and washed or sufficient base can be added during the neutralization step to catalyze the subsequent cyanoethylation reaction. In this latter manner the isolation and even the washing of the acid-hydrolyzed starch can be avoided.

Acrylonitrile is then added to an aqueous alkaline suspension (pH 7 to 12) of the granular acid-hydrolyzed starch in a concentration sufficient to provide a cyanoethyl starch having a D.S. of 0.01 to 0.09. In this D.S. range the utilization of acrylonitrile is quite efficient. It is rare that less than 50% of the acrylonitrile reacts with the starch. On the other hand, as much as 90% or more of the acrylonitrile added reacts with starch. In order to place as small a burden on plant sanitation facilities as possible, it is preferred to utilize from about .03 to .12 moles of acrylonitrile per mole of starch. However, larger (e.g. .20 moles) and smaller (e.g. .02 mole) concentrations can be used. The starch slurry is then maintained at a temperature below the gelatinization temperature of the starch until the cyanoethylation reaction is complete. The slurry is neutralized with dilute acid (sulfuric acid, hydrochloric acid, acetic acid, etc.) to a pH of about 6-8. After washing with water, the granular starch is dried.

Normally, no other modification of the starch is necessary. However, the starch can be bleached, if desired, in a manner well-known to this art in order to make the starch whiter.

Just prior to use the granular, cyanoethyl ether of acid-hydrolyzed starch is slurried in water at the desired concentration (1 to 20% by weight). The starch is pasted either by batch means or in a continuous starch cooker (e.g. a Votator) at a neutral pH (6 to 8) and then the paste is discharged into the size box. When a size press is employed, the starch size is applied to the paper while the cellulosic web is moving at 50 to 2,000 feet per minute, and then the paper is passed into the nip between two rolls. The starch size can be applied to the paper by passing the paper through a "puddle" of size maintained by supply from the size box, passing the paper over one roll of the size press partially submerged in size solution, by spraying the starch size onto one or both sides of the paper or by passing the paper web through the starch size bath.

In somewhat greater detail, the size press consists of two rolls, between which the paper travels as it receives the surface sizing solution. In a vertical size press, there are two rolls positioned one above the other. Usually starch size is sprayed onto the bottom roll of the size press or applied by the bottom roll of the press revolving in a solution of size. At the same time, a "puddle" of size solution is supplied to the top of the roll, usually by spraying. Normally a spring roll is located ahead of the press to keep the tension constant and to control the angle at which the paper enters the nip of the press rolls thereby determining the area of the "puddle" supported on the top side of the sheet. The angle is usually about 15-35°. Lowering the angle increases the area of the "puddle", thereby increasing pick-up of size. On the other hand, raising the angle decreases the area of the "puddle" and the pick-up of size by the cellulosic web.

In a horizontal size press, the two rolls are positioned side by side. The size is normally introduced in the nip at the center of the sheet and flows from the center of the sheet towards both ends. Usually each of the two "puddles" formed between one roll surface of the size press and one side of the cellulosic web is kept just large enough to provide a little size running off the ends of the rolls. During the sizing operation the pH of the size solution can drop to as low as 4 due to the leaching out of alum from the paper.

Irrespective of how the size is applied at the size press, the cellulosic web passes between rolls in order to drive the size into the paper and to remove excess size. The nip of the size press rolls is adjusted to exert a pressure of 5 to 200 pounds per lineal inch. In this way the penetration of the starch into the paper is adjusted to meet the requirements of the paper being sized. Usually at least one of the size press rolls is non-resilient while the other roll can be resilient (rubber) or non-resilient. The paper is then dried by suitable means.

If desired, the cyanoethyl ether or acid-hydrolyzed starch can be applied to the cellulosic web using an air knife, a trailing blade coater, a Champion knife coater, a calender stack, etc.

The alkaline fluidity of the acid-hydrolyzed starch referred to above is determined in the following manner. Five grams of the acid-hydrolyzed starch (dry solids basis) is placed in a 400 ml. fluidity beaker. Approximately 100 cc. of starch paste is prepared by adding 90 ml. of 0.25 N NaOH and 10 ml. of water to the beaker and the mixture is stirred at between 450 and 460 r.p.m. for three minutes. The starch paste contains 5 grams of starch and 0.90 grams of NaOH. The resulting starch paste is poured into a standard fluidity funnel having a specific "water-time" between about 30 and 40 seconds. The "water-time" is the number of seconds it takes for 100 cc. of water to flow through the funnel. The number of cc. of starch paste which flows through the funnel in the water-time is the fluidity of the starch. Unmodified starch has about a 1 cc. fluidity.

The following examples are merely illustrative and should not be construed as limiting the scope of my invention.

The test for transmittance of white water referred to in the examples is carried out in the following manner. Sixty grams of rosin-and-alum-sized bleached sulfite pulp, 0.130 grams of titanium dioxide and 500 ml. of distilled water are placed in a Waring Blendor. After 1.8 ml. of 5.3 pH buffer composed of acetic acid and sodium acetate was added, the blender was run at low speed for one minute. The pulp was transferred to a 1000 ml. glass-stoppered graduate and sufficient water was added to bring the graduate level to 900 ml. The pulp was then mixed by gently inverting the graduate ten times and immediately thereafter 170 ml. of this pulp was transferred to a 500 ml. glass-stoppered graduate. After the 170 ml. of pulp was diluted to 500 ml. with distilled water, 0.8 ml. of a 1% by weight cooked starch paste of the sample to be evaluated was added to the 500 ml. graduate. The 500 ml. graduate was inverted ten times and then vacuum filtered through a 100 mesh screen. The percent transmittance of part of the filtrate, which had been poured into a ½" test tube, was determined at 650 microns wave length using a Spectronic 20 Spectrophotometer. After 18 hours the percent transmittance of the supernatant liquid in the filtrate was also determined at the same wave length.

Example I

To hydrolyze the starch, 4.1 parts by weight sulfuric acid (actual weight of acid) was added as a 30 Bé. aqueous solution to an aqueous slurry of 100 parts by weight unmodified corn starch (dry solids basis) suspended in 225 parts by weight water, which had been heated to 126° F. The reaction medium was maintained at between 126 and 128° F. until the starch had a five-gram fluidity of 91 cc. The acid hydrolysis reaction was then terminated by raising the pH of the reaction medium to 11 with 4.4 parts by weight sodium carbonate (dry solids basis) added as a 32% by weight aqueous solution, and 0.5 parts by weight NaOH (dry solids basis) added as a 1.5% aqueous solution. The reactor was sealed and purged with nitrogen by slowly bubbling nitrogen through the slurry. After nitrogen purging was stopped, 2 parts by weight acrylonitrile was added to the slurry through a dip tube under the surface of the slurry. After about 5 hours at 112° F. the reaction medium was made acidic (pH 5–5.5) with a 10% solution of sulfuric acid. The still granular starch was filtered, washed, reslurried with water, filtered and dried to about 12% moisture. The granular cyanoethyl ether of acid-hydrolyzed starch had a cyanoethyl D.S. (degree of substitution) of about 0.045.

The transmittance of white water was determined in the manner described for (1) the cyanoethyl ether of acid-hydrolyzed corn starch prepared in this example, (2) a hydroxyethyl corn starch used as a size press starch, (3) and an alkaline-hypochlorite-oxidized starch used as a size press starch. The results are set forth below in Table I.

TABLE I

| Starch | Initial Percent transmission | Percent Transmission after standing 18 hours |
|---|---|---|
| Alkaline-hypochlorite-oxidized starch | 36 | 57 |
| Hydroxyethyl starch | 51 | 91 |
| Cyanoethyl starch of this example | 55 | 93 |

The above data clearly indicates that the cyanoethyl ether of acid-hydrolyzed starch of this invention does not have the undesirable property of dispersing pigment.

Example II

Three thosuand pounds of the cyanoethyl ether of acid-hydrolyzed corn starch produced in the manner described in Example I was slurried at 12% solids in a 3500 gallon tank and pasted by heating the slurry to 208° F. The starch paste was supplied to the service tank (maintained at 145° F.) supplying the size bath of a vertical size press of a fourdrinier paper making machine running at 900 feet per minute. The size was sprayed onto the bottom roll of the size press and supplied as a puddle to the top of the paper web. The paper web passing through the nip of rolls was subjected to pressure of about 100 pounds per lineal inch and dried. A batch of alkaline-hypochlorite-oxidized starch was used as a size with the paper machine set at 850 feet per minute immediately before and 900 feet per minute immediately after the cyanoethyl starch of this invention. Paper sized with the cyanoethyl ether of acid-hydrolyzed starch of this invention and with alkaline-hypochlorite-oxidized starch had essentially the same effect on the erasure properties, Mullen value, opacity, smoothness, porosity, oil flotation, ink flotation and stiffness of the base paper.

The above illustrates that the cyanoethyl starches of this invention are excellent size press starches.

Example III

Three thousand pounds of the cyanoethyl ether of acid-hydrolyzed corn starch produced in the manner described in Example I was slurried in 1800 gallons of water and pasted at 196° F. to form a 10% by weight solids paste. The starch paste was pumped to a storage tank of an off-machine tub sizing operation. A 20-pound, bleached sulfite sheet containing 50 pounds per ton of titanium dioxide and clay filler (ratio of titanium dioxide to clay filler was 75/100) was passed through the tub size, through the nip of a vertical size press and dried. It took approximately 24 hours to use up the 3,000 pounds of starch. Essentially the same operation was carried out using a hydroxyethyl size press starch. Paper sized with the cyanoethyl ether of acid-hydrolyzed starch of this invention and hydroxyethyl starch had essentially the same effect on the erasure properties, Mullen value, porosity, opacity, smoothness and stiffness of the base paper. Tappi Routine Control Method RC–14 entitled Ink Penetration of Paper (flotation) and modified Tappi Routine Control Method RC–74 entitled Surface Sizing Feathering Test indicated that paper sized with the cyanoethyl starch of this invention had better properties (less ink penetration and feathering) than paper sized with the hydroxyethyl starch.

Since many embodiments of this invention can be made and since many changes may be made in the embodiments described, the foregoing is to be interpreted as illustrative only and our invention is defined by the claims appended hereafter.

I claim:

1. A paper base bearing a size consisting essentially of a cyanoethyl ether of starch acid-hydrolyzed to a fluidity of about 75 to 97 cc. having a cyanoethyl D.S. of 0.01 to 0.09.

2. The article of claim 1 wherein said cyanoethyl ether of starch has a cyanoethyl D.S. of 0.03 to 0.06.

3. The process which comprises sizing a paper web with a composition consisting essentialy of an aqueous paste having a pH of about 4 to 8 of a cyanoethyl ether of starch acid-hydrolyzed to a fluidity of about 75 to 97 cc. having a cyanoethyl D.S. of 0.01 to 0.09 followed by drying said web.

4. The process of claim 3 wherein said paste is applied to said paper web as the paper passes between two rolls.

(References on following page)

References Cited

UNITED STATES PATENTS

| | | | |
|---|---|---|---|
| 2,836,511 | 5/1958 | Sample | 106—210 X |
| 2,836,512 | 5/1958 | Sample | 106—210 X |
| 2,965,632 | 12/1960 | Paschall et al. | 260—233.3 |
| 3,224,891 | 12/1965 | Yeates et al. | 117—156 X |
| 3,264,283 | 8/1966 | Jarowenko | 260—233.3 |

OTHER REFERENCES

Starch and Starch Products in Paper Coating, Tappi Monograph Series No. 17, by the Technical Association of the Pulp and Paper Industry, 1957, pp. 121–122.

WILLIAM D. MARTIN, *Primary Examiner.*

M. LUSIGNAN, *Assistant Examiner.*